Sept. 1, 1931.  A. E. GIBSON  1,821,301
PIN FOR ARTIFICIAL TEETH
Original Filed Sept. 24, 1924
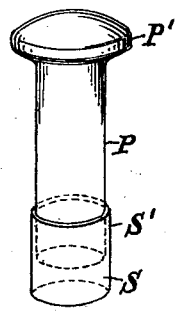
FIG. 1
FIG. 2  FIG. 3  FIG. 4
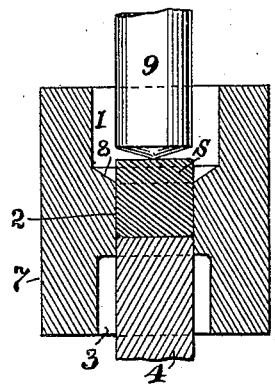 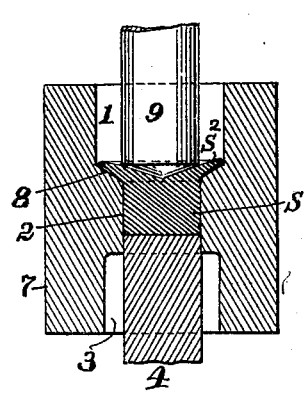 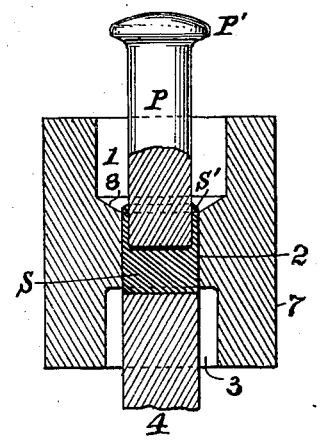
Inventor.
Albert E. Gibson.
By
Attorney.

Patented Sept. 1, 1931

1,821,301

UNITED STATES PATENT OFFICE

ALBERT E. GIBSON, OF SPRINGFIELD, PENNSYLVANIA, ASSIGNOR TO THE DENTISTS' SUPPLY COMPANY OF NEW YORK, A CORPORATION OF NEW YORK

PIN FOR ARTIFICIAL TEETH

Original application filed September 24, 1924, Serial No. 739,574. Divided and this application filed September 15, 1928. Serial No. 306,116.

My invention has for its object the attachment of solder to the ends of pins employed in the manufacture of artificial teeth wherein the pins are soldered to anchoring means embedded in the porcelain of the tooth, the benefits to be derived from the present invention being the reduction in labor and cost in assembling the pins and solder in the anchors before being subjected to a solder fusing temperature which insures the union of the pins and anchors.

This application is a division of my application Serial No. 739,574, filed September 24, 1924, for Machine for applying solder to pins, the present application being restricted to the unitary structure comprising the pin and its attached solder.

The customary practice in the manufacture of artificial teeth is to first insert small cylinders of solder dipped in a suitable flux solution and thereafter insert the shank of a headed pin, allowing it to rest upon the solder. Upon fusing the solder, the pin settles down into the anchor and becomes soldered thereto.

Objection to this method of procedure arises from the fact that two distinct operations with small tweezers must be had, one for first handling the solder particles, and the other for handling the pins; and further, that as the solder particles are quite small and rounded, it is not easy to select and pick them up and, therefore, the operation involves considerable time of the operator which is chargeable against the cost of production.

A further objection is that as the pins loosely rest on the solder, they are not always in upright position and hence upon fusing the solder they sometimes become attached to the anchors in an objectionably inclined position.

These objections are wholly overcome by providing solder attached to the ends of the pins as a preliminary product, so that when picking up the pin, the operator also picks up the attached solder; and when the pin with the attached solder is inserted in the hole and anchor, it is held in an upright position by reason of the solder fitting the anchor more closely than the pin itself would fit the porcelain hole as heretofore.

My invention comprises, therefore, a unitary structure consisting of a headed pin for artificial teeth having its end provided with a body of solder formed with a circular or annular flange extending upward about the pin end and frictionally held thereon, as more fully described hereinafter and pointed out in the claim.

Referring to the drawings: Fig. 1 is a perspective view of my improved pin with attached solder; and Figs. 2, 3, and 4 are vertical sectional views of the dies and materials illustrating the method of attaching the solder to the pin.

The pin in its finished construction, as shown in Fig. 1, provides the shank P having a suitable forged head P' at its upper end and an attached body of solder S at its lower end, said solder secured thereto by frictional contact of a surrounding annular flange S' formed of the solder itself.

My invention will be better understood by a brief explanation of the method or mode of attaching the solder to the pin and which may be elucidated by reference to Figs. 2, 3 and 4 of the drawings, which respectively show successive steps in the method.

In Fig. 2, 7 represents a die having an enlarged opening 1 at the top and connecting with a similar enlargement 3 at the bottom by a throat 2 of smaller diameter. There is also provided a conical floor to the opening 1, the inclination of said floor being downward and communicating with the top of the throat 2. 4 is an anvil and reciprocates vertically from a position within the throat 2, as shown in Fig. 2, to a lower position as shown in Fig. 4. 9 is a plunger which is reciprocated vertically in alinement with the anvil 4 and throat 2, and its lower portion is made somewhat conical. S represents a short cylinder of solder and in Fig. 2 is shown as positioned within the upper portion of the throat 2 and between the plunger 9 and anvil 4.

Considering the anvil 4 as constituting an abutment, the plunger 9 is driven downward and spreads the upper portion of the solder cylinder into inverted mushroom shape, as shown in Fig. 3. After the solder has been flanged as indicated in Fig. 3, the plunger 9 is removed and the pin P is forcibly driven downward upon the solder, as shown in Fig. 4, and moreover, as it is driven downward the anvil 4 is lowered so that the solder is forced through the throat 2 and the flanged solder is thus shaped into an annular flange about the end of the pin, as shown at S'. When this is accomplished, the downward pressure upon the pin is removed and the anvil 4 driven upward to release the pin and solder attached thereto from the die 7. The pin with its attached solder is then as indicated in Fig. 1, and the solder is attached in accurate alinement with the pin shank and secured thereto by friction. The diameter of the solder is slightly larger than the pin shank.

The operations here recited for attaching the solder to the pin are more fully described in the parent application Serial No. 739,574, hereinbefore referred to, of which the present application is a division.

It will now be apparent that I have devised a novel and useful construction which embodies the features of advantage enumerated as desirable, and while I have shown the preferred embodiment of my invention which I have found in practice to give satisfactory results, I do not restrict myself to the precise details as the same are susceptible of modification without departing from the spirit or scope of the invention.

Having now described my invention, what I claim and desire to secure by Letters Patent is:

As an article of manufacture, a pin for an artificial tooth having a headless end, combined with a cup-shaped body of solder of thick mass abutting directly against the end of the pin, said solder having a very thin annular flange portion of substantially uniform thickness mechanically stretched and die shaped about and cold compressed upon the pin so as to be firmly set and frictionally held thereto in accurate alignment.

In testimony of which invention, I hereunto set my hand.

ALBERT E. GIBSON.